April 3, 1962  G. ORLOFF  3,027,917
SERVO VALVES AND SERVO VALVE SYSTEMS
Filed March 1, 1960  2 Sheets-Sheet 1
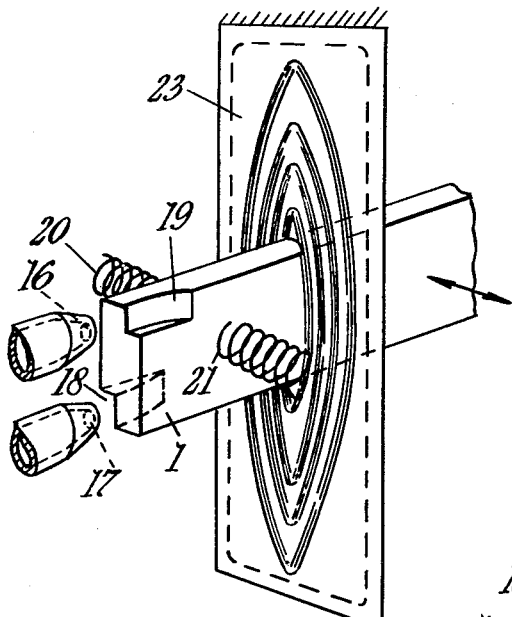
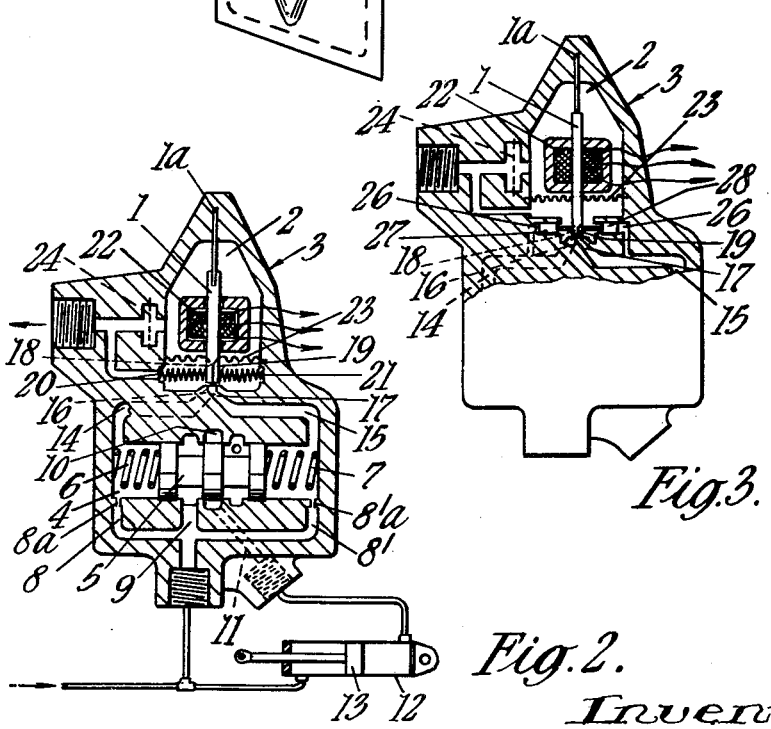
Inventor
G. Orloff Inventor
G. Orloff Patented Apr. 3, 1962

3,027,917
SERVO VALVES AND SERVO VALVE SYSTEMS
George Orloff, Crawley, England, assignor, by mesne assignments, to Normalair Limited, Yeovil, England
Filed Mar. 1, 1960, Ser. No. 12,015
Claims priority, application Great Britain Mar. 12, 1959
6 Claims. (Cl. 137—623)

This invention relates to servo valves and servo valve systems of the kind embodying an obturating member upon which a jet or jets of hydraulic fluid discharged from a nozzle or nozzles impinge, the pressure pertaining at the nozzle or nozzles being varied in accordance with the position of the obturating member relative thereto so as to bring about governing of a valve member.

In arrangements of this kinds which have been proposed hitherto, difficulties have been encountered in controlling vibration of the obturating member and the non-linear nature of the hydraulic reactions at the obturating member. Satisfactory operation has also been impaired for certain applications by the fixed nature of the relationship governing the load to which the obturating member is subjected, the displacement of the obturating member and the pressure pertaining in the chamber in which the valve member is mounted.

It is an object of the present invention to provide an arrangement which obviates the foregoing difficulties and which provides additional improvements to servo valves and servo valve systems of the kind specified.

According to the present invention there is provided a servo valve or servo valve system of the kind referred to, wherein the nozzle(s) is so arranged with respect to the obturating member that either the plane(s) formed by the nozzle end(s) is parallel to a pivot axis or virtual pivot axis about which the obturating member moves or the centre axis or axes of the jet(s) intersects the said pivot axis or virtual pivot axis and wherein the face of the obturating member adjacent to the jet or jets is so formed as to provide a knife edge or knife edges on which the jet(s) may impinge, the arrangement being such that lateral movement of the obturating member causes a vibration in the pressure(s) obtaining at the nozzle or nozzles and is such that the hydraulic forces acting upon the obturating member can be controlled and if necessary eliminated independently of the performance of the valve member whose position is being governed.

Preferably the obturating member is biased into its normal position by spring means which counter the torque or force to which the obturating member is subjected.

Figure 4:
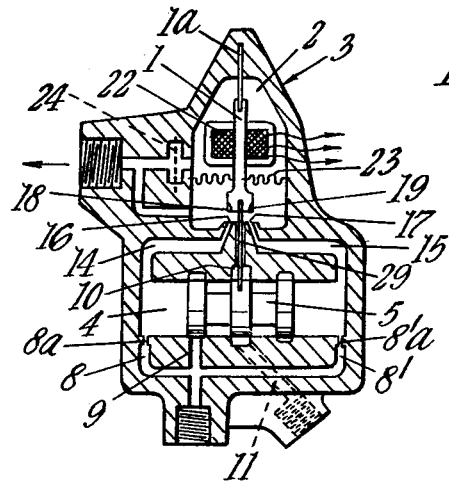
Figure 5:
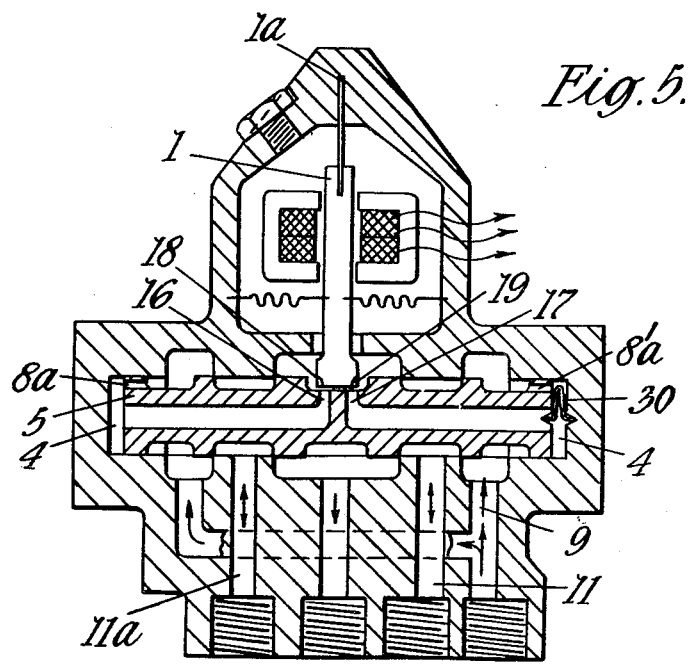

One mode of carrying the present invention into effect will now be described, by way of example, with reference to the diagrammatic drawings in which:

FIGURE 1 shows the arrangement of the nozzles and obturating member according to the present invention, FIGURE 2 is a sectional view of a two stage servo system according to the present invention, and FIGURE 3 is a partly sectional view of a modified form of the system shown in FIGURE 2, FIGURES 4 and 5 are sectional views of a further modified form of the system shown in FIGURE 2.

Referring firstly to FIGURES 1 and 2, there is shown a two staged servo system embodying an obturating member 1 located within a chamber 2 formed in a housing 3, and mounted at one end on a leaf spring 1a secured in the housing 3. A second chamber 4 is formed in the housing in which a spool valve member 5, comprising three pistons mounted on a common piston rod, is located. The valve member 5 is biased towards the position in which it is shown in FIGURE 2 by two springs 6 and 7. Hydraulic fluid under pressure is admitted into the chamber 4 by three ducts 8, 8' and 9. The ducts 8 and 8' lead through constrictions 8a, 8'a, into the chamber 4 on either side of the valve member 5. The duct 9 leads to the centre of the chamber 4 into a recess formed between the first and second pistons of the valve member 5. An annular groove 10 is formed in the wall of the chamber 4, which groove encircles the middle piston of the valve member 5 and is of different width to that of the middle piston. A duct 11 leads from the annular groove 10 to one end of a hydraulic cylinder 12 in which an actuating piston 13 is mounted. The other end of this cylinder is in communication with the supply of hydraulic fluid under pressure. Two ducts 14 and 15 lead from the chamber 4 to two nozzles 16 and 17 shown in FIGURE 1 which discharge a jet of fluid into the chamber 2 from whence the fluid passes to a reservoir (not shown). The obturating member 1 is located in the path of the jets from the nozzles 16 and 17. Two recesses 18 and 19 are formed in the end of the obturing member adjacent the nozzles 16 and 17. These recesses are so formed that two knife edges are provided in the face of the obturating member facing the nozzles, which break away in a gradual incline to the sides of the obturating member. The nozzles 16 and 17 are so positioned in relation to the obturating member that the direction of flow of the fluid within the jets is substantially coplanar with the centre plane of the obturating member. The arrangement of the nozzles 16 and 17 and the obturating member 1 is such that the jets of hydraulic fluid from the nozzles impinge the knife edges, formed in the face of the obturating member adjacent the nozzle by the recesses 18 and 19, in such a manner that lateral swinging movement of the obturating member 1 about an axis determined by the leaf spring 1a will cause differential pressures to pertain at the nozzles 16 and 17. These will cause differential pressures to be set up on either side of the valve member 5 in the chamber 4. It will be appreciated from the foregoing that the pressure pertaining at the nozzles 16 and 17 upon swinging lateral movement of the obturating member can be predetermined by suitably adjusting the configuration of the recesses 18 and 19.

At the same time, the shape of the knife edge(s) is such as to allow a predetermined amount of hydraulic load, although very small, to be fed back onto the obturating members, from the chamber 4.

The obturating member 1 is biased towards the position in which it is illustrated in FIGURE 1 by two springs 20 and 21 mounted on the walls of the chamber 2. The springs 20 and 21 counter the torque or force to which the obturating member 1 is subjected from an electro-magnetic relay or torque motor 22. This electro-magnetic relay is housed in the upper part of the chamber 2 which is filled with hydraulic fluid and which is sealed from the system by two diaphragms 23 and 24. The diaphragm 23 as shown in FIGURE 1 is secured to the walls of the chamber 2 and to the obturating member 1. This diaphragm is substantially without stiffness and can be made porous, although it must be of a sufficiently fine texture to set as a fine filter, preventing dirt particles, particularly of a ferrous nature, being attracted by the electro-magnetic relay. The diaphragms ensure that the hydraulic fluid within the part of the chamber 2 in which the electromagnetic relay 22 is housed is not subjected to severe pressure differentials during operation of the device.

In operation of the device, signals fed to the electromagnetic relay cause swinging lateral movement of the obturating member 1 about the axis determined by the leaf spring 1a. Upon lateral movement of the obturating member out of the position in which the obturating member is illustrated in FIGURE 1, the pressures pertaining at the nozzles 16 and 17 and thus on either side of the valve member 5 in the chamber 4 will vary. Such a pressure differential on either side of the valve member 5 will cause the latter to undergo axial movement. Movement of the valve member 5 in one direction will put the ducts 9 and 11 in communication with one another, whereby there will be an increase in pressure in one end of the cylinder 12 in which the actuating piston 13 is mounted; whilst movement of the valve member 5 in the other direction allows fluid to be discharged from the cylinder 12 into the chamber formed between the pistons of the valve member 5 connected to the reservoir with a corresponding reduction in pressure in the cylinder 12.

FIGURE 3 shows an arrangement in which the obturating member 1 may be subjected to a larger degree of feed back from the chamber 4 than in the arrangement described above, as well as a greater degree of damping. Two cylinders 25 and 26 are formed in the walls of the chamber 2, which are in communication with the ducts 14 and 15 leading from the chamber 4 to the nozzles 16 and 17. Pistons 27 and 28 are positioned within the cylinders and these pistons are provided with piston rods acting upon the obturating member 1. These pistons 27 and 28 may either be used as shown or in combination with the springs 20 and 21, described above, in parallel or in series as required.

FIGURE 4, shows an arrangement in which the obturating member 1 is subjected to feedback in accordance with the position of the spool valve. As shown a leaf spring 29 is secured at one end to the obturating member 1 and at its other end to the centre piston of the spool valve 5.

FIGURE 5 shows an arrangement in which the nozzles 16 and 17 are formed in the body of the spool valve member 5. In this case the constructions 8a, 8'a in the pressure sources leading to the opposite ends of the chamber 4 are formed in the end pistons of the spool valve member 5. The spool valve 5 is prevented from rotation about its longitudinal axis by a V-shaped laminated spring 30 engaging in V-grooves formed in one end of the spool valve 5 and in the housing respectively.

A further arrangement may be provided which is not illustrated, in which pistons secured to the obturating member by piston rods, are located within cylinders in communication with the hydraulic cylinder 12 in which the actuating piston 13 is located. This provides an output load feed back to the system; it will be appreciated that this arrangement may be embodied in any of the arrangements described above.

If desired the position of the actuating piston may be fed back on to the obturating member by means of suitable linkages acting on a spring, or springs, the biasing force of which will counter the torque input on to the obturating member. This arrangement may be used in conjunction with the above described alternative feed back arrangements.

It will furthermore be appreciated that the arrangements shown in the figures, whilst relating to twin nozzles (16 and 17) can equally well apply to a single nozzle arrangement, in which case the valve member (5) will only have one spring acting in opposition to a single pressure chamber.

Although FIGURES 2 and 3 illustrate the valve member 5 as being formed as a triple pistoned member embodied in a differential pressure servo system, the above improvements naturally apply equally well to symmetrical systems, i.e. four pistoned valve members or to multi-pistoned members in multi-servo systems.

It will also be appreciated that although the input has been described as an electro-magnetic relay, this could equaly well be a manual, pneumatic or hydraulic arrangement applied through means best suited to the nature of the input medium.

Finally it will be appreciated that the aforegoing examples have been described by way of example only and that any further modifications may be made to the invention in order to suit varying requirements.

I claim:
1. In a servo-mechanism for hydraulic control systems having, a valve movable in opposite directions for controlling fluid flow in a fluid pressure operated device, means for moving the valve comprising a pair of fluid actuated members movable in respective fluid passageways and coupled to said valve, means for supplying pressure fluid to said passageways for normally equally biasing said members in opposite directions, an outlet nozzle communicating with each of said passageways for providing parallel directed fluid jets; the improvement comprising an obturating member including a movable planar wall having edge surface portions normally positioned in alignment with the respective fluid jets, opposite surfaces of the planar wall each having a recess extending to its respective edge surface portion and parallel to a respective fluid jet, and means for moving the obturating member to selectively move one of the recesses toward a corresponding fluid jet to relatively vary the fluid pressures in the passageways to cause movement of the valve.

2. In a servo-mechanism for hydraulic control systems having, a valve movable in opposite directions for controlling fluid flow in a fluid pressure operated device, means for moving the valve comprising a pair of fluid actuated members movable in respective fluid passageways and coupled to said valve, means for supplying pressure fluid to said passageways for normally equally biasing said members in opposite directions, an outlet nozzle from each of the passageways for providing parallel directed fluid jets; the improvement comprising a movably mounted planar wall member having its opposite surfaces parallel to the fluid jets and an edge surface having portions adjacent to and normally confronting the nozzle openings and recessed portions laterally of each confronting portion, the recessed portions lying along opposite wall surfaces, and means for moving the wall member in a direction transversely to its opposite surfaces to move the edge wall with one of its recesses into confronting relation with one of the nozzles to relatively vary the fluid pressures in the passageways for moving the valve.

3. In a servo-mechanism for hydraulic control systems having, a valve movable in opposite directions for controlling fluid flow in a fluid pressure operated device, means for moving the valve comprising a pair of fluid actuated members movable in respective fluid passageways and coupled to said valve, means for supplying pressure fluid to said passageways for normally equally biasing said members in opposite directions, an outlet nozzle communicating with each of said passageways for providing spaced parallel directed fluid jets; the improvement comprising a movably mounted wall member having an edge surface adjacent to the nozzles with its central plane normally confronting the nozzle openings, said edge surface having a recess on each side of the central plane laterally of the location at which the edge surface normally confronts the respective nozzle opening, and means for moving the wall member in a direction to move the edge surface radially of the nozzle openings to position one of the recesses into confronting relation with one of the nozzles to relatively vary the fluid pressures in the passageways for moving the valve.

4. In a servo-mechanism for hydraulic control systems as defined by claim 3, in which the side wall of each recess meets the edge surface of the wall at such an angle as to present a knife-like edge to the fluid jet when in confronting relation with a respective nozzle opening.

5. In a servo-mechanism for hydraulic control systems as defined in claim 3, in which the side wall of each recess meets the edge surface of the wall at such an angle as to present a knife-like edge to the fluid jet when in confronting relation with a respective nozzle opening, the recesses being opened laterally through the respective adjacent wall surfaces with the inner-most walls of the recesses being gradually inclined toward a respective wall surface.

6. In a servo-mechanism for hydraulic control systems as defined by claim 3, and including electromagnetic means for moving said wall member.

References Cited in the file of this patent

UNITED STATES PATENTS

| | | |
|---|---|---|
| 2,824,574 | Place | Feb. 25, 1958 |
| 2,836,154 | Lantz | May 27, 1958 |
| 2,947,286 | Baltus | Aug. 2, 1960 |

FOREIGN PATENTS

| | | |
|---|---|---|
| 562,592 | Great Britain | July 7, 1944 |
| 931,747 | Germany | Aug. 16, 1955 |